United States Patent [19]

Teremy et al.

[11] Patent Number: 5,634,156
[45] Date of Patent: May 27, 1997

[54] PRINTING EXPOSURE REFERENCE

[75] Inventors: Paul Teremy, Rochester; Dale F. McIntyre, Honeoye Falls; Joseph A. Manico, Rochester, all of N.Y.

[73] Assignee: Eastman Kodak Company, Rochester, N.Y.

[21] Appl. No.: 356,814

[22] Filed: Dec. 15, 1994

[51] Int. Cl.⁶ ............................................. G03B 17/24
[52] U.S. Cl. ............................................. 396/315
[58] Field of Search ........................... 354/105, 106, 354/109, 289.12; 396/315

[56] References Cited

U.S. PATENT DOCUMENTS

| | | | |
|---|---|---|---|
| 4,182,560 | 1/1980 | Oguchi et al. | 354/106 |
| 4,344,683 | 8/1982 | Stemme | 354/106 |
| 4,365,882 | 12/1982 | Disbrow | 354/106 |
| 5,086,310 | 2/1992 | Iwashita et al. | 354/75 |
| 5,126,214 | 6/1992 | Tokailin et al. | 428/690 |
| 5,128,702 | 7/1992 | Ogawa et al. | 354/106 |
| 5,151,629 | 9/1992 | VanSlyke | 313/504 |
| 5,151,726 | 9/1992 | Iwashita et al. | 354/109 |
| 5,204,707 | 4/1993 | Harvey | 354/75 |
| 5,227,837 | 7/1993 | Terashita | 354/109 |
| 5,311,228 | 5/1994 | Stoneham et al. | 354/106 |
| 5,319,401 | 6/1994 | Hicks | 354/106 |
| 5,319,402 | 6/1994 | Tsujimoto et al. | 354/106 |
| 5,365,290 | 11/1994 | Suzuki et al. | 354/106 |
| 5,376,484 | 12/1994 | Iwagaki | 354/106 |
| 5,382,508 | 1/1995 | Ikenoue | 354/106 |
| 5,389,989 | 2/1995 | Hawkins et al. | 354/106 |
| 5,404,196 | 4/1995 | Torashita et al. | 354/105 |
| 5,412,444 | 5/1995 | Kazami | 354/106 |
| 5,452,049 | 9/1995 | Takagi | 354/106 |

*Primary Examiner*—Safet Metjahic
*Assistant Examiner*—Nicholas J. Tuccillo
*Attorney, Agent, or Firm*—David A. Howley; Charles E. Snee, III

[57] ABSTRACT

A camera uses an organic thin film of electroluminescent material to expose photographic film, in predetermined positions outside scene frames, to patches of light in three complementary colors, either additive or subtractive. According to one feature, the patches are exposed in predetermined locations interspersed with film perforations or located in a known relationship with the exposed frames, permitting a printer to establish the orientation of film relative to the camera during the exposure. The patches also confirm that a picture was taken.

5 Claims, 6 Drawing Sheets

# PRINTING EXPOSURE REFERENCE

CROSS REFERENCE TO RELATED APPLICATIONS

Reference is made to commonly assigned, copending U.S. patent applications Ser. No. 08/311,619, entitled AC Drive Scheme For Organic LED, filed on Sep. 23, 1994, in the names of Ching Wan Tang and Steven A. VanSlyke; and U.S. patent application Ser. No. 08/146,347, now U.S. Pat. No. 5,387,989 entitled Camera For Recording Digital And Pictorial Images On Photographic Film, filed Oct. 29, 1993 in the names of Gilbert A. Hawkins and Jose Mir. The disclosures of both referenced applications hereby are incorporated by reference into the present specification.

BACKGROUND OF THE INVENTION

1. Field of Invention

The invention relates to photography, and more specifically to cameras and methods that use a reference exposed on film in a camera to facilitate subsequent printer adjustments. The invention has particular utility for correcting color balance degraded by environmental effects during storage of the film before and after its exposure.

2. Description of the Prior Art

It is known to expose film in a camera with information pertaining to the photographic event. Examples include titles, time and date stamps, information regarding the number of prints desired (Iwashita et al. U.S. Pat. No. 5,086,310),and information regarding the desired aspect ratio for "tele,""pan" or normal prints (Harvey U.S. Pat. No. 5,204,707).

It also is known to expose the film with information that can be used later by a printer to adjust its color balance. Oguchi et al. U.S. Pat. No. 4,182,560, issued Jan. 8, 1980, discloses an optical diffuser in a camera that exposes the film to a patch of illumination integrated over essentially the entire scene. The exposed patch is used during printing to balance three complementary illumination sources so they print the patch as a neutral gray. Stemme U.S. Pat. No. 4,344,683, issued Aug. 17, 1982, discloses a camera that prints a test pattern within the exposure frame for determining if any picture blur occurred when the film was in the camera or during printing. The pattern is developed and printed within the margins of the final print, and may include three zones exposed to luminous diodes of different colors. The zones can be used as a ready check for color filtering during printing. Disbrow U.S. Pat. No. 4,365,882, issued Dec. 28, 1982, discloses an aerial camera including a device for exposing the film to color references typical of healthy crops. The references are exposed, developed and printed adjacent to the crop images and are compared to the images for identifying the condition of the crops.

PROBLEM SOLVED BY THE INVENTION

Prior art approaches, such as those noted above, provide many advantages associated with printing operations. It will become apparent, however, that significant additional benefits are available according to the teaching of the present specification.

Approaches that integrate light from a scene are dependent on the illumination source and subject reflectivity, particularly their wavelengths and intensities. Although most scenes integrate to gray, and this knowledge is used for color correction, the captured information is not truly related to degradation of the film or the latent images it contains. Deleterious environmental effects that occur during raw stock or latent image keeping are not directly represented.

Color references that mimic scene characteristics, such as the health of crops, are not intended for color correction, but instead represent a known standard to which the printed scene is compared after it is printed.

The above-mentioned test pattern is used for identifying the source of picture blur. Although it may include three zones exposed to luminous diodes of different colors, the pattern is within the image frame on the film and the final print, detracting from its appearance.

Other problems with prior art approaches relate to the source of the reference illumination. Although already mentioned in connection with scene illumination, which cannot be controlled, the availability of a suitable reference also is a problem with separate illumination sources, such as light emitting diodes. Existing diodes do not provide the desired flexibility for size and shape, particularly not on a single substrate, do not produce the desired colors in a sufficiently narrow range of wavelengths, and require undesirably high currents for the light produced.

SUMMARY OF THE INVENTION

The present invention is directed to overcoming one or more of the problems set forth above. Briefly summarized, according to one aspect of the invention, a camera includes an internal source of reference illumination controlled to expose the film to patches of light in predetermined patterns and positions outside the exposure frames. According to certain features, the patches correspond to narrow predetermined ranges of wavelengths in three complementary colors, either additive or subtractive. According to other features, film speed is determined and the reference control varies the intensity or duration of the reference illumination to adjust the reference exposure according to the film speed.

More specific features of the invention include illumination sources that comprise organic thin films of electroluminescent material that emit light in narrow wavelength bands when subjected to a voltage difference across the film. Still more specific features expose the patches on the film in predetermined locations interspersed with film perforations or located in known patterns of shapes or colors that facilitate printer adjustments related to color balance and picture orientation.

The invention further includes a process for exposing photographic film in a camera, outside the scene frame borders, to a patch of illumination in a predetermined narrow wavelength band and/or an asymmetric pattern. The patch is developed with the scene and used by a recording device, such as a color printer, for making adjustments such as color balance and print orientation.

The invention provides a reference for printer adjustments to facilitate location of the exposure frames, determine the orientation of the exposed frames, and to correct film degradation that occurs during raw stock and latent image keeping. The reference is exposed on the film by the camera at approximately the same time the film is exposed, and the exposure is made from an illumination source that emits in narrow wavelength bands of complementary colors on a single substrate and with relatively low current.

These and other features and advantages of the invention will be more clearly understood and appreciated from a review of the following detailed description of the preferred embodiments and appended claims, and by reference to the accompanying drawings.

DESCRIPTION OF THE PREFERRED EMBODIMENTS

Figure 1:
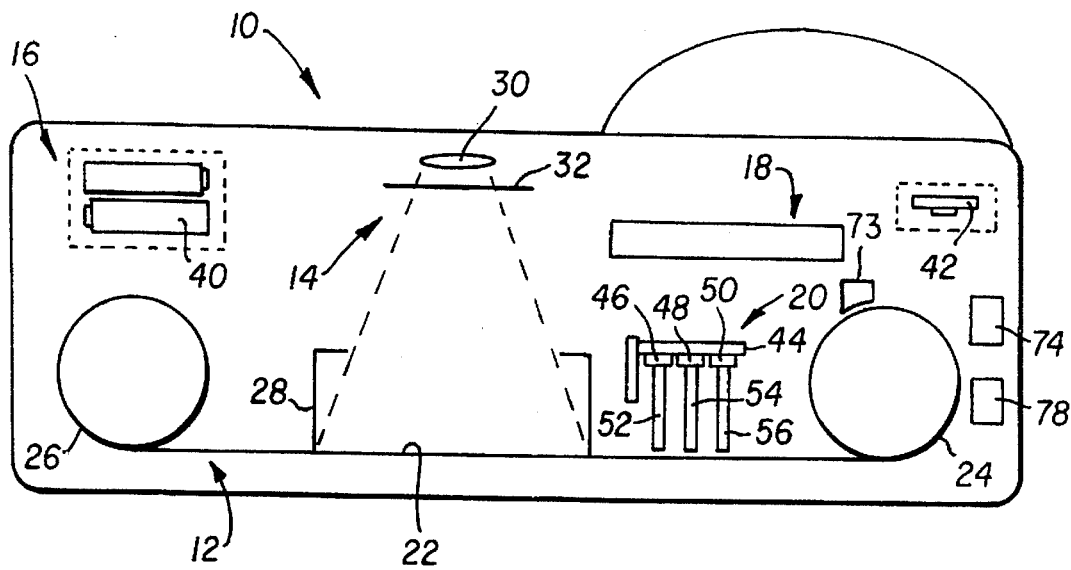
FIG. 1 is a schematic view of a camera including sources of illumination in three complementary colors for exposing the film to reference patches according to preferred embodiments of the invention.

Referring now to the drawings, a preferred embodiment of the invention is disclosed in a camera 10, including film advancing mechanism 12, exposure mechanism 14, power source 16, logic and control unit 18, and a reference exposure device 20.

Film advancing mechanism 12 operates in a known manner to meter movement of film 22 from supply chamber 24 across an exposure position to take-up chamber 26. Although the film 22 does not include any visible indication of an exposure or scene frame, the frames are established by camera structure, such as exposure box 28, when sequential segments of the film are metered into the exposure position, using advancing mechanism 12, and exposed there with exposure mechanism 14. The exposure frames become apparent after the film is developed.

Figure 2:
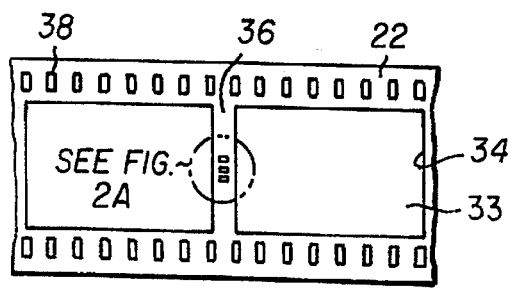
FIGS. 2–4 are partial top views of photographic film showing alternative locations for the reference patches exposed according to the preferred embodiments.

The exposure mechanism 14 also is known, and includes appropriate optics 30 and shutter 32 for exposing the film 22 to an intended scene. As depicted in FIG. 2, the exposures on the film define frames 33 with borders 34. Adjacent exposure frames are separated by an inter-frame space 36. Also depicted in FIG. 2 are perforations 38 evenly spaced in rows along the edges of the film. The exposure frames are located between the perforation rows.

Power source 16 includes two sets of batteries 40 and 42, one providing a DC voltage source for most camera operations and the other providing back-up for logic and memory functions when the first battery set 40 is replaced or otherwise turned off.

The reference exposure device 20 operates under the control of unit 18, with power from one or both sets of batteries 40 and 42. The reference device emits and delivers illumination at predetermined wavelengths to expose the film in reference patches outside of the exposure frame 33.

The patches serve a number of functions during printing related primarily to color correction, image orientation and image location. As depicted schematically in FIG. 1, the reference exposure device 20 includes a substrate 44 carrying organic electroluminescent elements in three areas 46, 48, 50. The three elements emit light in three complementary colors, either additive or subtractive. In an additive system, for example, the emitted wavelengths would be red, green and blue in predetermined narrow spectral bands centered tightly around the desired wavelengths. Light from the three elements 46, 48 and 50, is transmitted through wave guides or light channels 52, 54, and 56 to expose the film at predetermined locations relative to the exposure frames 33.

Figure 3:
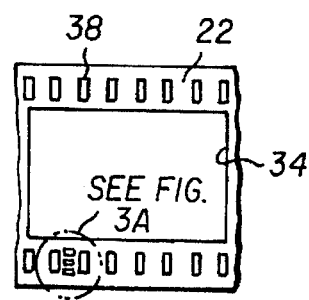
Figure 4:
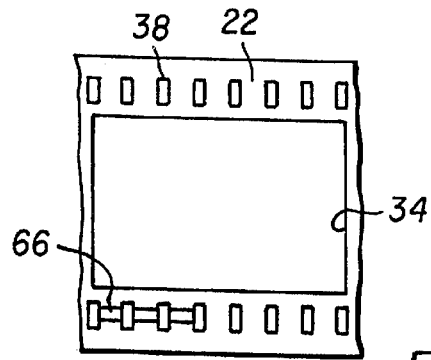

FIG. 4 depicts a preferred location for the reference patches 66, alternating with and between film perforations 38. According to the FIG. 4 orientation of the reference patches, the light channels 52, 54 and 56 are spaced, or otherwise direct the reference illumination, in a pattern having a pitch between adjacent patches equal to the pitch between the film perforations 38. FIGS. 2, 2A, 3, and 3A illustrate alternate locations for the reference patches. In FIGS. 2 and 2A the reference patches 58, 60 and 62 are located between the exposure frames at the trailing edge of the frame with which the patches are associated. In FIGS. 2, 2A, 3 and 3A, the patches extend in a row normal to the film, and the light channels 52, 54 and 56 would, of course, be rotated ninety degrees (90°), compared to FIG. 1, also extending in a line perpendicular to the direction of film movement. In FIG. 3 the patches are positioned as a group between the film perforations, indicated at 64.

The illumination elements 46, 48 and 50 are organic light emitting devices (OLED) according to the referenced application Ser. No. 08/311,619; and VanSlyke U.S. Pat. No. 5,151,629, issued Sep. 29, 1992. The application and patent both are incorporated by reference into the present specification. The devices each include a thin film of electroluminescent material between two electrodes, an anode and a cathode. The thin film has injecting and transporting zones, one for holes adjacent the anode and another for electrons adjacent the cathode. Holes and electrons from the zones move toward each other and combine when subjected to a voltage bias across the electrodes, causing the luminescent material to emit radiation in relatively narrow visible wavelengths depending on the particular organic materials chosen for the zones. If the film is very thin, less than approximately one micrometer (1 µm), for example, high current densities are available with relatively low resistance, providing brightness levels that are readily visible in ambient light with low applied voltages. Emissions can be limited to narrow spectral ranges, such as plus or minus twenty nanometers (+/−20 µm) from the target wavelength, in three complementary colors, either additive or subtractive.

Figure 2A:
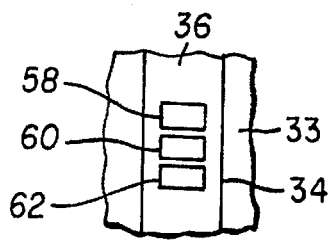
FIGS. 2A and 3A are partial enlargements of FIGS. 2 and 3, respectively.
Figure 3A:
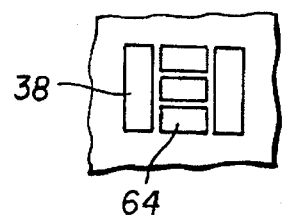

A particularly advantageous feature of OLEDs is their ability to provide multiple colors on a single substrate, as depicted in FIG. 1. A monolithic device is constructed by masking the substrate and depositing appropriate OLED materials in the different areas to emit in the desired colors, all on a single substrate.

Although the above-referenced application describes an improvement that applies forward and reverse biasing to the OLEDs. Such an approach normally would not be required in a camera, where the periods of use are short. For the purpose of the present specification, only a forward bias is used during normal operation.

Figure 5:
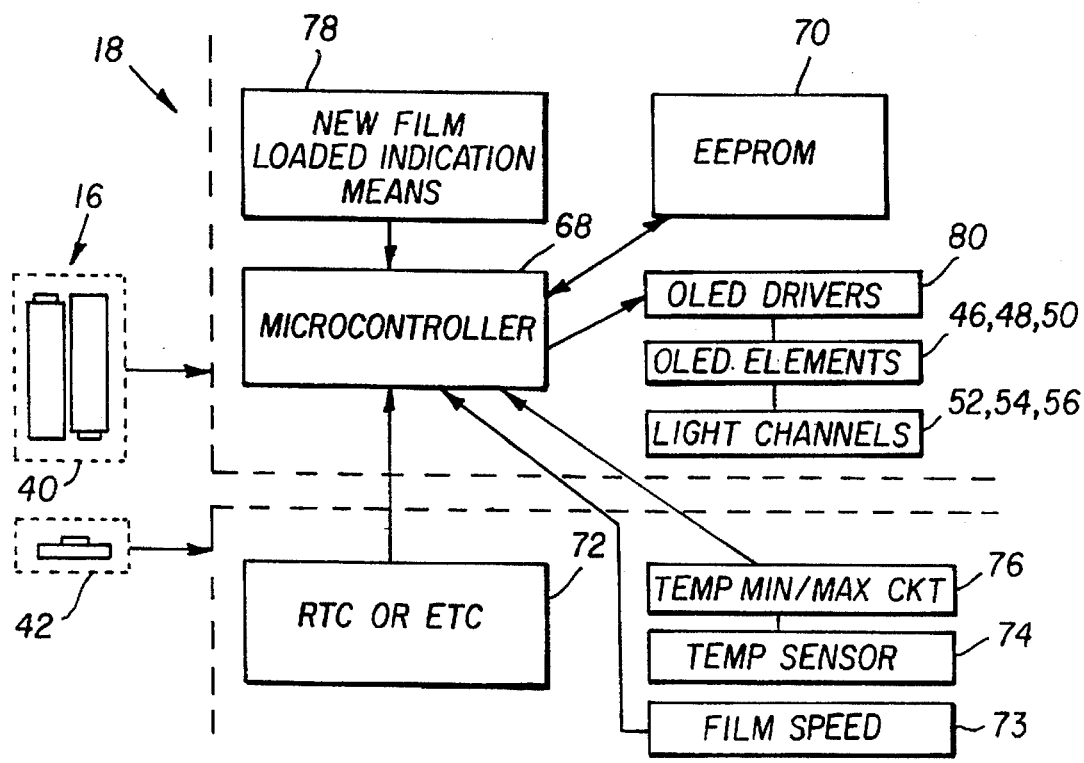
FIG. 5 is a block diagram depicting features of the camera of FIG. 1.
Figure 6:
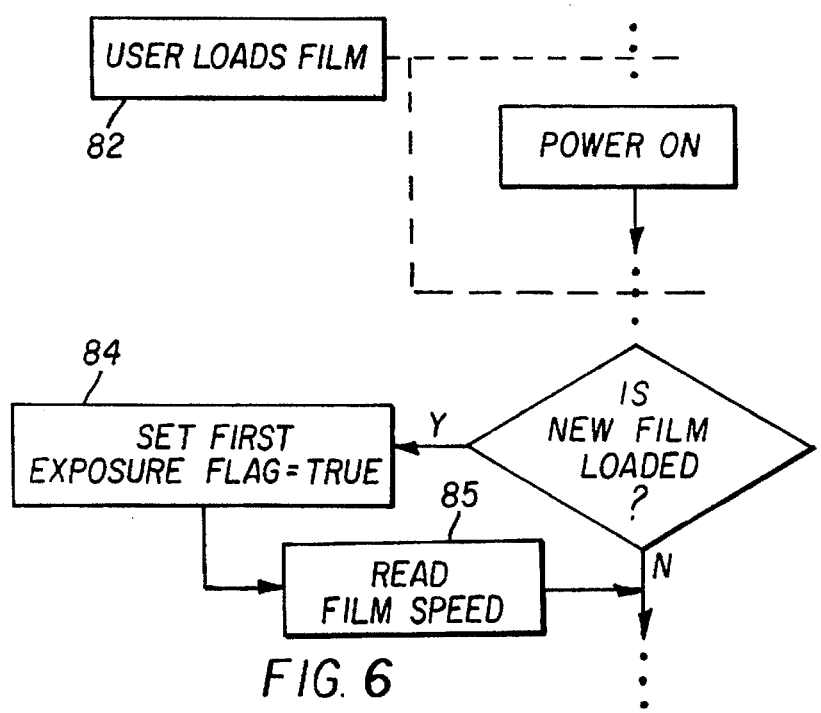
FIGS. 6 and 7 are partial flow diagrams depicting the operation of the camera of FIG. 1.
Figure 7:
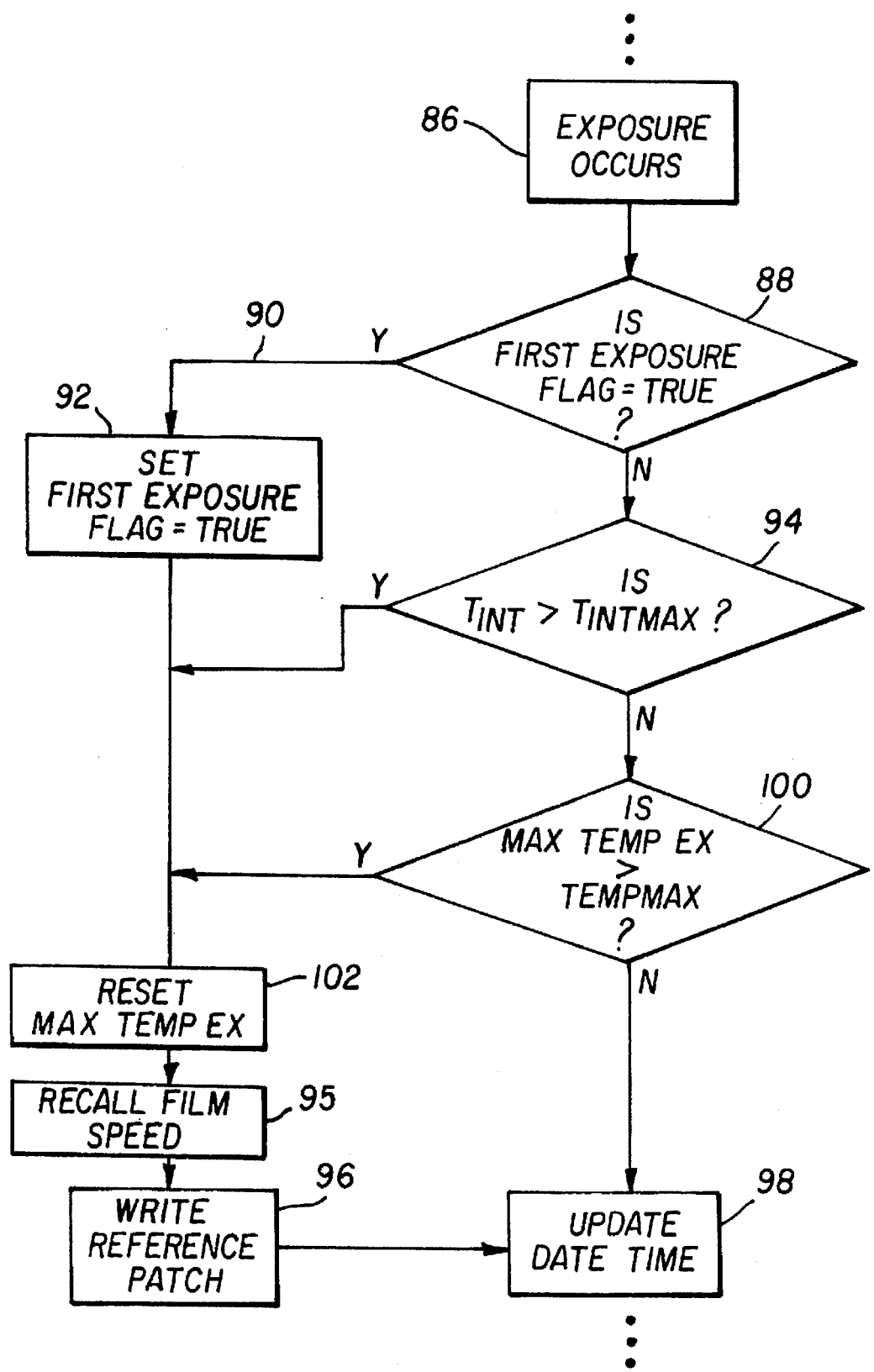

Referring now to FIGS. 5–7, various functions of logic and control unit 18 are depicted in more detail, including microcontroller 68, appropriate memory 70, real or elapsed time clock 72, film speed sensor 73, temperature sensor 74 and related temperature excursion circuit 76, "film present" sensor 78, and drivers 80 for the electroluminescent elements 46, 48, and 50.

Exposure of the reference patches is controlled by microcontroller 68 to determine when the patches are exposed and also the duration and intensity of the exposure. Film speed sensor 73 is located adjacent the film supply chamber 24 and reads film speed information from the film cartridge, sometimes referred to as DX information. The microcontroller then varies the reference exposure according to the film speed by adjusting either or both of the exposure time and duration. In some applications the reference patches might be exposed by pulsing the illumination elements, and the level of exposure then could be varied by the number of pulses, again reflecting sensed film speed. Depending upon the color properties of the film, the level of reference illumination also can be varied according to the color exposed in combination with the film speed.

In the simplest form of the invention, the film is exposed with reference illumination from one or more elements 46, 48, and 50, each time a scene exposure is recorded on the film. In more sophisticated applications, however, environmental parameters are tracked, such as time and temperature, that are particularly relevant to chemical changes likely to occur in the film during raw stock and latent image keeping.

According to these more sophisticated features, the microcontroller 68, indirectly supplied with conditioned power from source 16, monitors the loading status of film through sensor 78. Upon detecting the loading of a new film roll, 82 in FIG. 6, the microcontroller sets a memory flag in EEPROM 70. This is depicted at 84 in FIG. 6. Film speed also is sensed at 85 and stored in memory for later use.

Referring now to FIG. 7, after each exposure, at 86, the microcontroller checks the status of the memory flag, 88, to determine if the exposure is the first exposure on the film roll. If it is the first exposure, 90, a reference patch is exposed on the film and the memory location is reset 92. In order to track the time interval between scene exposures, a date-time data byte is initialized to the current date and time or, if an elapsed timer is used, it is reset to zero. Since elapsed time and temperature are important environmental factors that effect raw stock and latent image keeping, the microcontroller calculates the interphoto interval from the stored date-time byte associated with the previous exposure and compares the result to a maximum interphoto interval time "$T_{max}$". If the calculated interval exceeds the maximum interval, at 94, the film speed is recalled and the film is exposed to another calibration patch, at step 96, with a duration and intensity appropriate for the recalled film speed. The microcontroller also tracks temperature excursions between exposures, reading a memory location that records such excursions. If the temperature excursion between exposures exceeds a maximum allowance, at 100, the film is exposed to another calibration patch, 96. Each time a calibration patch is exposed on the film, the time and temperature bytes are reset, at 102 and 98, and the process is restarted.

Figure 8:
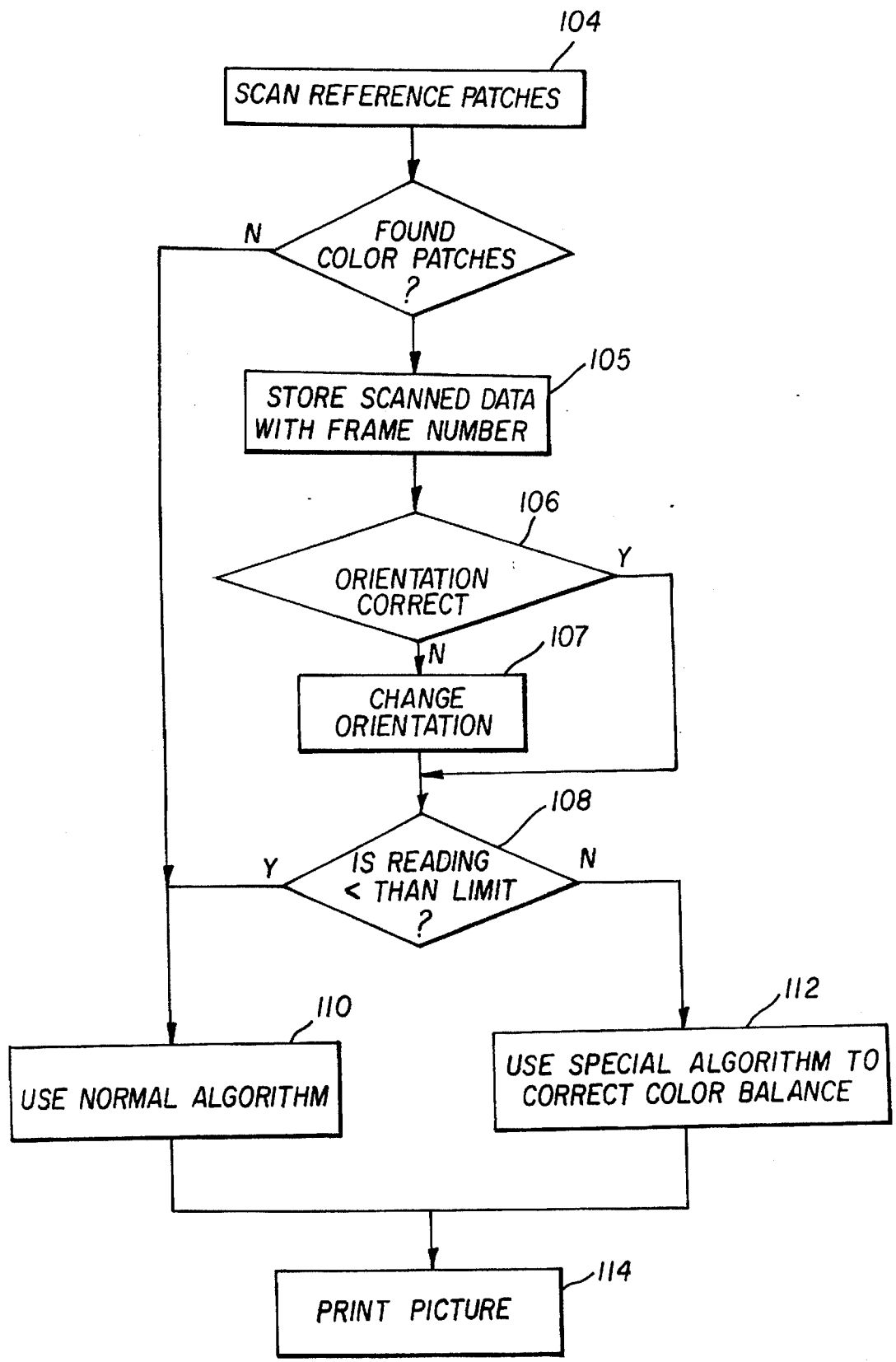
FIG. 8 is a partial flow diagram depicting operation of a printer according to the preferred embodiment.

FIG. 8 depicts the use of the reference patches in a printing operation or other recording device to determine the orientation of the scene frames and to correct color balance that might have degraded during raw stock and latent image keeping. After the film is processed, the exposed reference patches are visible and are scanned by the printer, at 104. The scanned data is stored with the frame or scene exposure number, at 105.

According to certain features of the invention, asymmetry in the pattern of the reference patch or patches, including, for example, the location, shape or color of the pattern, is used to determine the orientation of the scene frames. In an index printer or compact disk recorder, for example, the recording device can change the orientation of the scene images for consistency with other pictures or the normal presentation of the corresponding player. Even in conventional printers, knowledge of scene orientation simplifies printer algorithms, or improves their performance, increasing the yield of first-time prints. This feature will become more apparent from the description of FIGS. 9-11. The orientation feature also is represented in FIG. 8, where the position or pattern of the reference patches is determined at 106. The scene orientation is modified at 107, if desired, before it is captured on the recording medium.

According to other features of the invention, the patches are use to correct color balance. For this purpose the scanned information is compared to permitted limits, at 108. Since the wavelengths emitted by the illumination elements are known, the scanned data, representing the wavelengths reflected or transmitted by the developed film, can be compared to the known emissions. If the comparison indicates any difference is within predetermined limits, again at 108, the printer is operated with its normal filters and algorithms, at 110. If, on the other hand, the film has degraded due to environmental factors during raw stock and latent image keeping, special filters or algorithms are used, at 112, to correct for the degradation. The color balance is corrected in the printer to return the print, at 114, to the desired color characteristics.

DESCRIPTION OF AN ALTERNATIVE EMBODIMENT

Figure 9A:
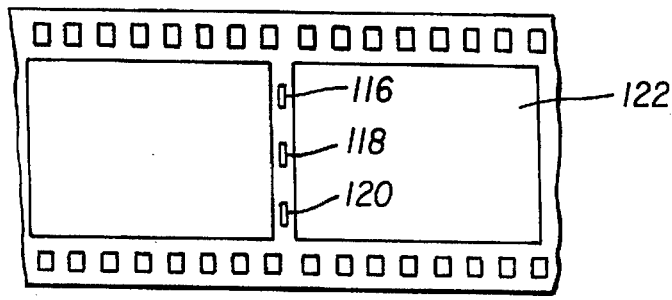
FIG. 9A is a partial top view depicting the location of reference patches according to an alternative embodiment of the invention.
Figure 9B:
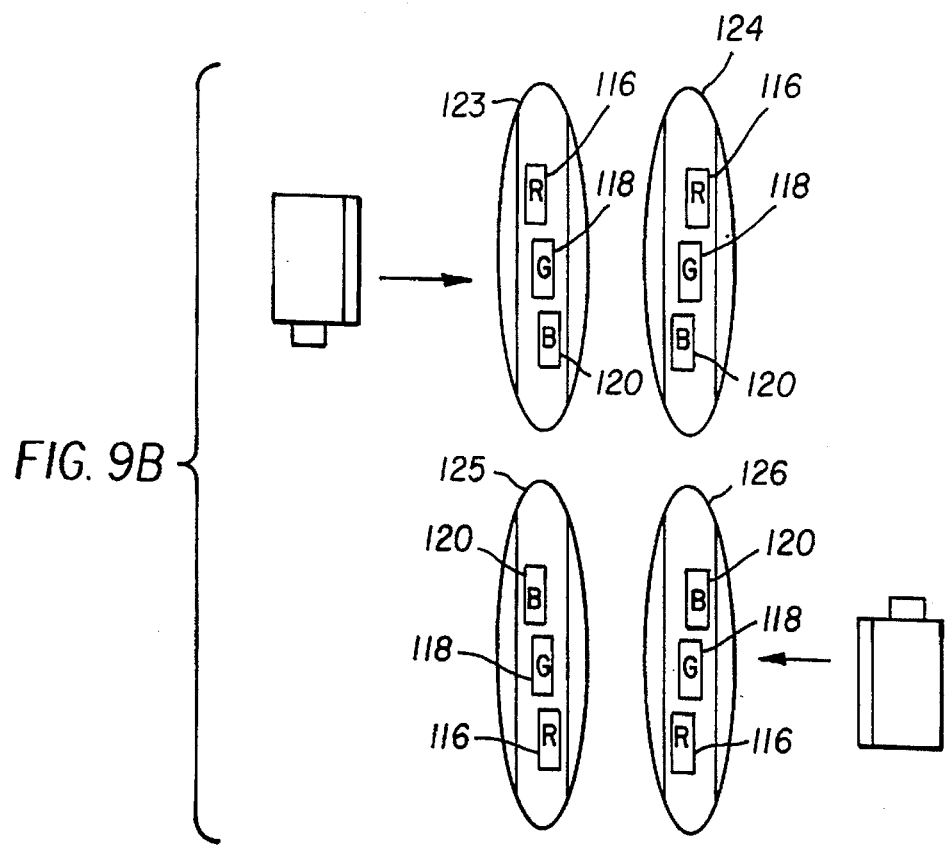
FIG. 9B is a partial enlarged view of a portion of FIG. 9A.
Figure 10:
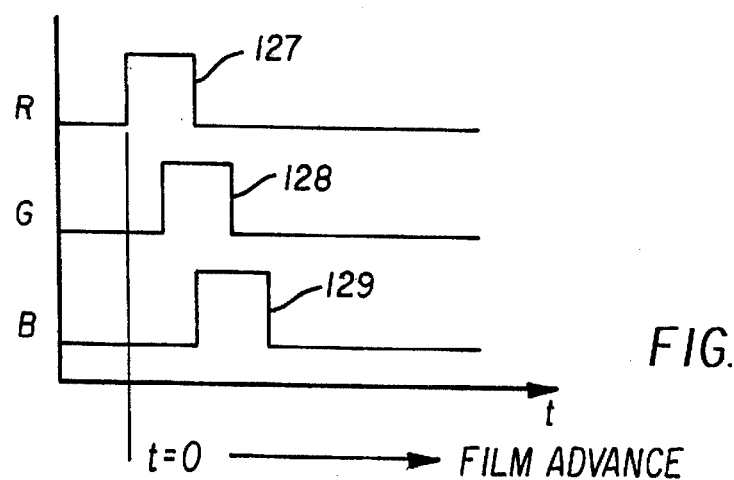
FIG. 10 is a graph depicting a reference patch exposure sequence for producing the patches depicted in FIGS. 9A and 9B.

FIGS. 9A, 9B and 10 represent an alternative embodiment of the invention that is similar to the preferred embodiment in all respects except the following. Color references 116, 118 and 120 are exposed sequentially on the film, interspersed with film movement, to offset the patches longitudinally one from another, defining an asymmetrical pattern associated with one of the scene frames 122. The asymmetry may be in the dimensions, configuration, location, color or other parameter discernible by the printer. In this alternative embodiment, it is the offset that is used by the printer to determine the orientation of the film when it was exposed in the camera. If the film is exposed in a camera loaded from the left in a normal winding camera, i.e. a camera that exposes the film while it is pulled from the cartridge, the reference patches will be displaced from one another down and toward the right as depicted at 123 in FIG. 9B. If loaded from the left in a prewind camera, i.e. a camera that exposes the film while it is returned to the cartridge, the reference patches will be displaced up toward the right, as depicted at 124 in FIG. 9B. When the film is loaded from the right, the reference colors will be reversed, as depicted at 125 and 126 in FIG. 9B.

Relative displacement of the reference patches is accomplished during longitudinal movement between scene exposures. The red reference patch 116 is exposed first, at 127 in FIG. 10, followed momentarily, and during film movement, by the green reference patch, at 128, and the blue reference patch, at 129.

Figure 11A:
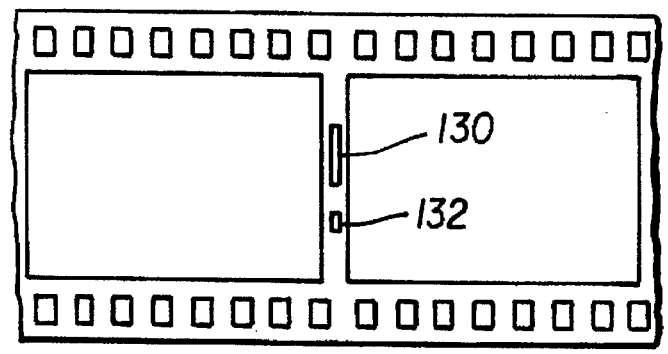
FIG. 11A is a partial top view depicting reference patches similar to those illustrated in FIG. 10A, but in alternative patterns according to another embodiment of the invention.
Figure 11B:
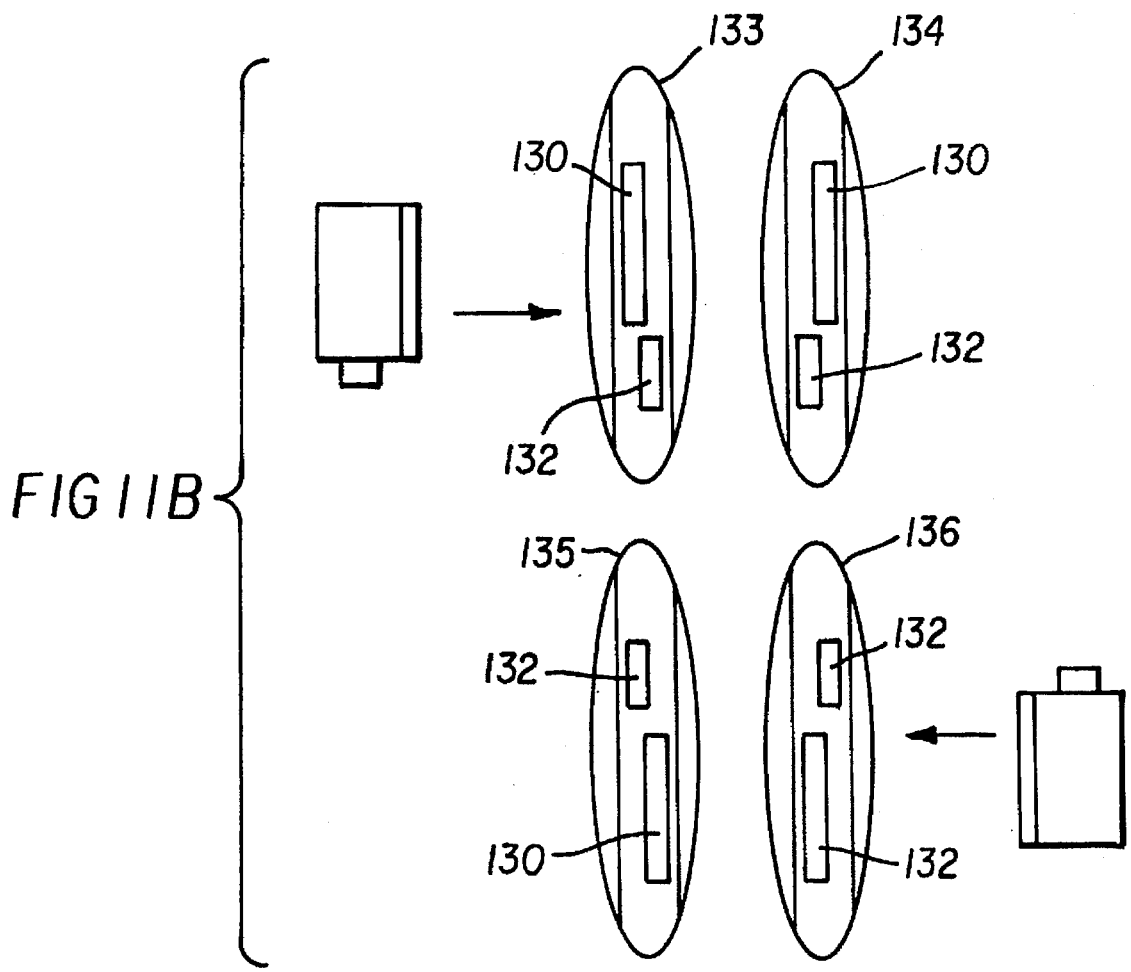
FIG. 11B is a partial enlarged view of a portion of FIG. 11A.

FIGS. 11A and 11b illustrate another alternative embodiment of the invention similar to the embodiment of FIGS.

9–10, but using an asymmetrical pattern based on shapes 130 and 132, and their relative positions, instead of colors. Insets 133 and 134 represent left loaded cameras that are normally wound and prewound, respectively. Insets 135 and 136 represent right loaded cameras that are normally wound and prewound, respectively. In the embodiment of FIGS. 11A and 11B, a single color is chosen for the reference patches 130 and 132 that correlates with the emulsion layer most sensitive to degradation from time and temperature during latent image keeping. This feature permits simplification of the control logic, and the reference exposure device 20 including its transfer optics.

It should now be apparent that the reference patches provide a mechanism for correcting color degradation during raw stock and latent image keeping. In addition, asymmetry in the geometric or color pattern of the reference patch(es), or the orientation of a reference patch relative to other related reference patches, can be used to identify the orientation of the film when it was exposed in a camera. Prewound film exposures can be recognized compared to normally wound exposures. Exposures from left and right loading cameras can be separately identified. Vertical exposures with the camera rotated clockwise can be segregated from exposures taken after counterclockwise camera rotation. Still further, the presence of the reference patches can be used to indicate that an exposure was, in fact, taken and the location of the frame edges. The presence and location of a scene exposure is difficult for the printer to identify in certain circumstances, such as lightning or stars against an otherwise black background. The presence of a reference patch provides a positive indication that an exposure was made, and the known position of the reference patch can be used to locate the edges of the exposure.

While the invention is described in connection with preferred embodiments and alternative embodiments, other modifications and applications will occur to those skilled in the art. The claims should be interpreted to fairly cover all such modifications and applications within the true spirit and scope of the invention.

| | |
|---|---|
| 10. Camera | 66. Alternative location of reference pattern |
| 12. Film advancing mechanism | 68. Microcontroller |
| 14. Exposure mechanism | 70. Memory |
| 16. Power source | 72. Clock |
| 18. Logic & control unit | 73. Film speed sensor |
| 20. Reference exposure device | 74. Temperature sensor |
| 22. Film | 76. Temperature circuit |
| 24. Supply chamber | 78. "Film present" sensor |
| 26. Take-up chamber | 80. Illumination drivers |
| 28. Exposure box | 82. New film detected |
| 30. Optics | 84. Set memory flag |
| 32. Shutter | 85. Sense film speed |
| 33. Exposure frame | 86. Exposure |
| 34. Exposure frame border | 88. Memory flag check |
| 36. Inter-frame space | 90. First exposure |
| 38. Perforations | 92. Reset memory flag |
| 40. Batteries | 94. Time interval comparison |
| 42. Battery | 96. Write patch |
| 44. Substrate | 98. Update time byte |
| 46. Electroluminescent element | 100. Temperature excursion comparison |
| 48. Electroluminescent element | 102. Reset temperature byte |
| | 104. Scan reference patches |
| 50. Electroluminescent element | 105. Store scanned data |
| 52. Light channel | 106. Position determined |
| 54. Light channel | 107. Orientation modified |
| 56. Light channel | 108. Compare to permitted limits |
| 58. Red reference patch | 110. Use normal algorithm |
| 60. Green reference patch | 112. Use special algorithm |
| 62. Blue reference patch | 114. Print picture |
| 64. Alternative location of reference pattern | 116. Red reference patch |
| | 118. Green reference patch |
| 120. Blue reference patch | |
| 122. Scene exposure frame | |
| 123. Left load normal wind | |
| 124. Left load prewind | |
| 125. Right load normal wind | |
| 126. Right load prewind | |
| 127. Timing of red reference exposure | |
| 128. Timing of green reference exposure | |
| 129. Timing of blue reference exposure | |
| 130. Pattern | |
| 132. Pattern | |
| 133. Left load normal wind | |
| 134. Left load prewind | |
| 135. Right load normal wind | |
| 136. Right load prewind | |

What is claimed is:

1. A camera including a mechanism for sequentially advancing photographic film to position successive frames in an exposure position; characterized in that:

the camera includes an internal illumination source and means for controlling said source to expose the film sequentially, interspersed with film movement, in a plurality of areas to produce an asymmetric pattern on the film, the relative position of the exposed plurality of areas to each other combined with the color and/or shape of the exposed areas indicating whether the film was exposed in a prewind or regular wind type camera, and/or whether the film was exposed in a left or right load camera.

2. The invention of claim 1, wherein said asymmetry includes longitudinal asymmetry produced by relative movement between the film and said source.

3. The invention of claim 1, wherein said pattern is asymmetrical in color.

4. The invention of claim 1, wherein said pattern is asymmetrical in shape.

5. The invention of claim 1, wherein said pattern is exposed during film advancement between successive scene exposures, whereby a printer can use said asymmetrical pattern to establish the orientation of film in the camera during the scene exposures.

* * * * *